(12) United States Patent
Van Liere

(10) Patent No.: US 7,640,891 B2
(45) Date of Patent: Jan. 5, 2010

(54) ASSEMBLY OF A GATE FOR USE IN ANIMAL TRAFFIC

(75) Inventor: Marinus Hubrecht Van Liere, Kloetinge (NL)

(73) Assignee: Maasland N.V., Maassluis (NL)

( * ) Notice: Subject to any disclaimer, the term of this patent is extended or adjusted under 35 U.S.C. 154(b) by 0 days.

(21) Appl. No.: 11/601,716

(22) Filed: Nov. 20, 2006

(65) Prior Publication Data

US 2007/0113794 A1    May 24, 2007

(30) Foreign Application Priority Data

Nov. 18, 2005    (NL) .................................. 1030459

(51) Int. Cl.
  *A01K 1/00*    (2006.01)
  *A01K 15/00*    (2006.01)
(52) U.S. Cl. ...................................... 119/518; 119/524
(58) Field of Classification Search ................. 119/518, 119/524, 510, 516, 14.03, 738, 740, 743–745, 119/747, 748
See application file for complete search history.

(56) References Cited

U.S. PATENT DOCUMENTS

| | | | | |
|---|---|---|---|---|
| 3,792,686 A | * | 2/1974 | Needham et al. .......... | 119/14.03 |
| 4,854,268 A | * | 8/1989 | Kipe ......................... | 119/14.03 |
| 5,184,567 A | * | 2/1993 | Peacock ................... | 119/14.03 |
| 5,584,261 A | * | 12/1996 | Hart et al. ................ | 119/14.03 |
| 5,615,637 A | * | 4/1997 | Nelson ..................... | 119/14.03 |
| 5,803,015 A | | 9/1998 | Rhodes et al. | |
| 6,186,093 B1 | * | 2/2001 | Finn et al. ................ | 119/14.03 |
| 6,427,632 B1 | | 8/2002 | Horst et al. | |

FOREIGN PATENT DOCUMENTS

| | | |
|---|---|---|
| DE | 3623816 A1 | 1/1987 |
| EP | 1300067 A2 | 4/2003 |
| NL | 1022700 | 10/2004 |

OTHER PUBLICATIONS

Translation "Result on the search of international type".

* cited by examiner

*Primary Examiner*—Son T. Nguyen
(74) *Attorney, Agent, or Firm*—David P. Owen; Howrey LLP

(57) ABSTRACT

An assembly of a gate for use in animal traffic, and an animal recognition device that is provided with a reading device disposed on the gate and an identification device worn by an animal, the gate comprising two swing doors, that are each pivotable about their own almost vertical axis. The lower side of one of the swing doors is situated at a higher level than the lower side of the other swing door.

9 Claims, 1 Drawing Sheet

ASSEMBLY OF A GATE FOR USE IN ANIMAL TRAFFIC

CROSS REFERENCE TO RELATED APPLICATIONS

This application claims priority from Dutch application number 1030459 filed on 18 Nov. 2005, the contents of which are hereby incorporated by reference in their entirety.

BACKGROUND OF THE INVENTION

1. Field of the Invention

The invention relates generally to gates for use in animal traffic and more particularly to a gate for use in controlling movement of cows.

2. Description of the Related Art

Gates for controlling the movement of animals are generally known. Under certain circumstances, the gates may be provided with animal recognition devices that detect the presence of a particular animal and open the gate if the animal is permitted to pass. The animal may be fitted with e.g. an electronic identification tag, often attached to an ear of the animal, that is detected by a reading device.

In order for detection to be effective, the reading device must be located at a position where it can reliably detect the animal or tag. Nevertheless, the reading device must also be protected from damage by the animal. One assembly is known from EP-A-1,300,067 which includes a plurality of reading devices in order to reliably recognise the animal. Although this known assembly functions properly, the reading devices for the gate require a wide measuring range for detecting an animal. This means that the energy consumption involved with the use of the reading devices is relatively high.

BRIEF SUMMARY OF THE INVENTION

The present invention addresses these problems by providing a gate comprising a gateway for passage of an animal, a door mounted to pivot about a generally vertical axis from a closed position in which passage of the animal through the gateway is inhibited to an open position in which passage is allowed, an opening formed between the gateway and the door in its closed position, the opening being sized to allow insertion of at least part of the head of the animal, an animal recognition reading device located adjacent to the opening and responsive to recognition of a particular animal to emit a signal and an automatic actuator arranged to move the door to its open position in response to the signal from the reading device. By arranging the opening and reading device in this manner, the energy consumption of the reading device may be reduced.

According to a preferred embodiment, a second door is also mounted to pivot about a second generally-vertical axis in bat-wing relation to the first door whereby a lower side of the second door extends below the lower side of the first door. Owing to the fact that the lower side of the first door is situated at a higher level than the lower side of the other door, the animal, such as a cow, that wishes to go through the gate is inclined to push with the upper side of its head against the lower side of the first door. By disposing the reading device in the vicinity of the lower side of the first door, it is possible to reduce the detection range of the reading device relative to that of the known situation, since the animal usually wears the identification device on or near its head.

Each of the swing doors is preferably operated by only one operating element, such as a cylinder. This makes it possible to use a minimum number of moving parts, which leads to less wear, less sound annoyance and less energy consumption.

BRIEF DESCRIPTION OF THE DRAWINGS

The features and advantages of the invention will be appreciated upon reference to the following exemplary drawing, in which.

DESCRIPTION OF ILLUSTRATIVE EMBODIMENTS

Figure 1:
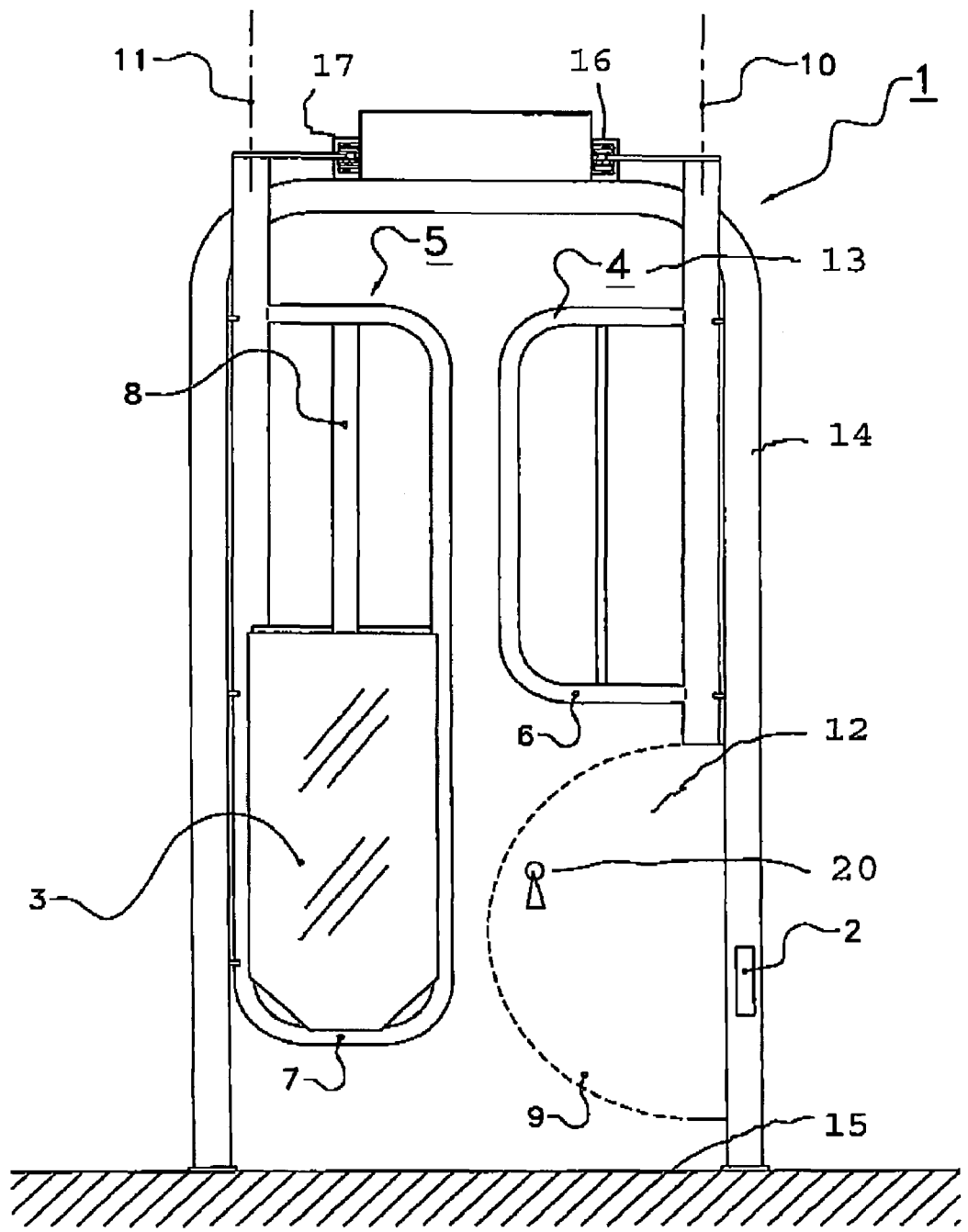
FIG. 1 is a schematic front view of an embodiment of an assembly according to the invention.

The following is a description of an embodiment of the invention, given by way of example only and with reference to the drawing.

FIG. 1 shows schematically an assembly of a gate 1 for use in animal traffic, and an animal recognition device that is provided with a reading device 2 and an identification device 20 worn by a (non-shown) animal. Such an identification device 20 is usually worn around the neck or on the ear of the animal, but may also be disposed in the animal's head. The gate 1 comprises gateposts 14, which together with floor section 15 form a gateway 13, and two swing doors 4,5, that are each pivotable about their own generally vertical axis 10, 11 in a bat-wing type relationship. The gate 1 may form part of a milking stall as either an entry or exit gate.

According to the invention, the lower side 6 of one swing door 4 is situated at a higher level than the lower side 7 of the other swing door 5. When an animal wishes to go through the gate 1, it will put its head into an opening 12 formed beneath the lower side 6 of the swing door 4 and then preferably push with the upper side of its head against said lower side. The reading device 2 is disposed in the vicinity of said lower side, so that the detection range, the relevant pan of which is indicated by the semicircle 9, is able to detect the identification device 20 worn by the animal. The reading device 2 may be disposed on a post 14 of the gate 1 (as shown in the figure), but might have been disposed as well in the swing door 4 near the lower side 6. In this manner a reading device having only a small detection range of e.g. 50 cm or less, will suffice, so that the costs (such as those for energy consumption) will be relatively low.

The other swing door is preferably provided with means, such as a board 3 or bars 8, so that it is impossible for an animal to put its head through the swing door 5. Moreover, it is possible to dispose the lower side 7 of the swing door 5 so close to the ground that it is impossible for the animal to put its head beneath the lower side 7.

Each of the swing doors 4,5 is preferably operated by only one operating element, such as first and second actuating cylinders 16, 17. This makes it possible to use a minimum number of moving parts, which leads to less wear, less sound annoyance and less energy consumption.

Thus, the invention has been described by reference to certain embodiments discussed above. It will be recognized that these embodiments are susceptible to various modifications and alternative forms well known to those of skill in the art without departing from the spirit and scope of the invention. Accordingly, although specific embodiments have been described, these are examples only and are not limiting upon the scope of the invention.

What is claimed is:

1. A gate for use in animal traffic, the gate comprising;

a gateway for passage of an animal;

a first door mounted to pivot about a generally vertical axis from a closed position in which passage of the animal through the gateway is inhibited to an open position in which passage is allowed, a second door mounted to pivot about a second generally vertical axis in bat-wing relation to the first door and whereby the second door is taller than the first door, with a lower side of the second door extending below the lower side of the first door;

an opening formed between the gateway and the first and second doors in their closed position, the opening being sized to allow insertion of at least part of the head of the animal;

an animal recognition reading device located adjacent to the opening and having a detection range substantially equal to the size of the opening and being responsive to detection of an identification device carried by the animal to emit a signal only when the head of the animal is within the detection range; and;

an automatic actuator arranged to move at least the first or second door to its open position in response to the signal from the reading device.

2. The gate as claimed in claim 1, wherein the gateway comprises a gate post and the opening is formed between the gate post and the second door.

3. The gate as claimed in claim 2, wherein the reading device is provided on the gate post below the lower side of the first door.

4. The gate as claimed in claim 1, wherein the gateway comprises a floor section beneath the doors and the opening is formed between a lower side of the first door and the floor section.

5. The gate as claimed in claim 4, wherein the reading device is disposed adjacent the lower side of the first door.

6. The gate as claimed in claim 1, wherein the actuator comprises a single fluid actuated cylinder.

7. The gate as claimed in claim 1, wherein a single fluid actuated cylinder is provided to operate the first door and wherein a second fluid actuated cylinder is provided to operate the second door.

8. A milking stall comprising a gate as claimed in claim 7, for retaining a dairy animal during a milking related operation.

9. A milking stall comprising a gate as claimed in claim 1, for retaining a dairy animal during a milking related operation.

* * * * *